United States Patent
Kwon et al.

(10) Patent No.: US 8,621,218 B2
(45) Date of Patent: *Dec. 31, 2013

(54) METHOD AND APPARATUS FOR MUTUAL AUTHENTICATION IN DOWNLOADABLE CONDITIONAL ACCESS SYSTEM

(75) Inventors: Eun Jung Kwon, Daejeon (KR); Han Seung Koo, Daejeon (KR); Soon Choul Kim, Daejeon (KR); Young Ho Jeong, Daejeon (KR); Heejeong Kim, Daejeon (KR); O Hyung Kwon, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 812 days.

This patent is subject to a terminal disclaimer.

(21) Appl. No.: 12/330,729

(22) Filed: Dec. 9, 2008

(65) Prior Publication Data

US 2009/0150672 A1    Jun. 11, 2009

(30) Foreign Application Priority Data

Dec. 10, 2007 (KR) .................. 10-2007-0127380

(51) Int. Cl.
*H04L 9/32* (2006.01)
*G06F 7/04* (2006.01)

(52) U.S. Cl.
USPC ............... 713/170; 713/171; 726/27; 726/30

(58) Field of Classification Search
USPC ............ 713/170, 171, 176, 178; 726/1–4, 27, 726/30
See application file for complete search history.

(56) References Cited

U.S. PATENT DOCUMENTS

| | | | |
|---|---|---|---|
| 2003/0046238 A1* | 3/2003 | Nonaka et al. | 705/51 |
| 2003/0172278 A1* | 9/2003 | Farnham et al. | 713/176 |
| 2006/0137015 A1* | 6/2006 | Fahrny et al. | 726/26 |
| 2007/0083766 A1* | 4/2007 | Farnham et al. | 713/176 |
| 2008/0098212 A1* | 4/2008 | Helms et al. | 713/155 |
| 2008/0177998 A1* | 7/2008 | Apsangi et al. | 713/155 |

FOREIGN PATENT DOCUMENTS

| | | |
|---|---|---|
| JP | 2005-245010 A | 9/2005 |
| KR | 1020010090167 A | 10/2001 |
| KR | 1020070057318 A | 6/2007 |
| KR | 1020080041369 A | 5/2008 |

* cited by examiner

*Primary Examiner* — Teshome Hailu

(74) *Attorney, Agent, or Firm* — Ladas & Parry LLP

(57) ABSTRACT

Disclosed is a mutual authentication method and apparatus in a CAS including a headend system and DCAS host. In particular, example embodiments relate to a mutual authentication method and apparatus in DCAS, wherein the mutual authentication is performed between an authentication server of the headend system and an SM of a DCAS host, and then CAS software is downloaded to the SM. According to the example embodiments, there is provided a mutual authentication protocol between the authentication server of the headend and the SM of the DCAS host in a cable network, and also provided a mutual authentication method and apparatus in the DCAS where a substantial authentication based on a hardware, such as a smart card or a cable card, is not needed.

21 Claims, 8 Drawing Sheets

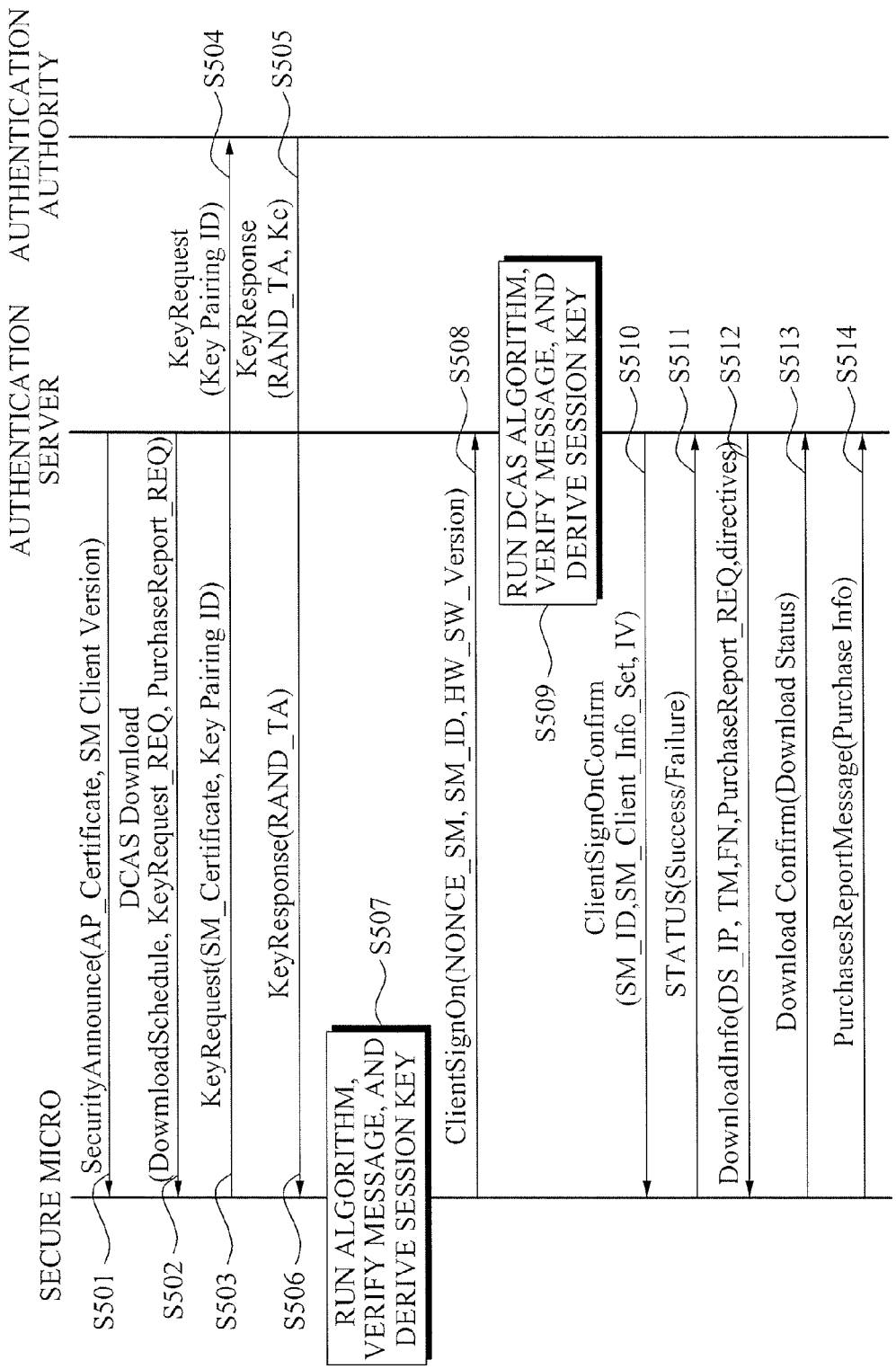

METHOD AND APPARATUS FOR MUTUAL AUTHENTICATION IN DOWNLOADABLE CONDITIONAL ACCESS SYSTEM

CROSS-REFERENCE TO RELATED APPLICATION

This application claims priority from Korean Patent Application No. 10-2007-0127380, filed on Dec. 10, 2007, in the Korean Intellectual Property Office, the entire disclosure of which is incorporated herein by reference.

BACKGROUND OF THE INVENTION

1. Field of the Invention

The present invention relates to a method and apparatus for mutual authentication in a Conditional Access System (CAS) including a headend system and Downloadable Conditional Access System (DCAS). In particular, the present invention relates to a method and apparatus for mutual authentication in the DCAS in which a mutual authentication between an authentication server of the headend system and a secure micro (SM) of a DCAS host is performed, and then CAS software is downloaded in the SM.

This work was supported by the IT R&D program of MIC/IITA [2007-S-007-01, The Development of Downloadable Conditional Access System].

2. Description of Related Art

A Conditional Access System (CAS) is a system that assigns authority to view a fee-based broadcast to only authenticated subscribers. In order to provide a fee-based broadcasting service in current digital cable broadcast, a cable card of either a smart card form or a Personal Computer Memory Card International Association (PCMCIA) card form is generally used based on an embodiment form of Conditional Access (CA) application.

Since a predetermined time is required for card reissuance when a CAS defect occurs, by distributing CAS operating software (CAS Client) off-line using either the smart card or the PCMCIA card, there is a disadvantage that a quick corrective action is difficult and an additional cost for card reissuance occurs. Recently, developing a Downloadable Conditional Access System (DCAS) technique in a two-way cable communication network has been an issue in order to overcome the disadvantage. The DCAS technique is different from the technique which a CAS providers provides fee-based broadcasting service by installing CAS software selected by either a smart card or a PCMCIA. The DCAS technique mounts a secure micro (SM) where the CAS software may be stored, so that it simply renews the CAS software through the two-way cable communication network when a CAS defect occurs or the CAS software is updated.

Also, a plurality of Conditional Access (CA) systems is processed with a single SM chip in the DCAS technique, so that a cable provider is not subject to a specific CAS solution, but may select a CAS provider. Thus, competition among CAS providers may promote development of a various types of services. However, when the CAS software is transmitted to a subscriber set-top box which is in an unauthenticated status, the subscriber may illicitly watch the fee-based broadcasting service and an unpredictable situation may occur. Also, when the SM to be mounted in the set-top box does not authenticate an authentication server located in a headend server, there may be attack of a third-party server spoofing the authentication server 111. Therefore, in order to develop the DCAS, mutual authentication between the authentication server and the SM to be mounted in the set-top box should be performed.

Accordingly, effective mutual authentication may be required from the DCAS to solve the above-described problems.

SUMMARY OF THE INVENTION

An aspect of the present invention provides a method and apparatus for mutual authentication in a Downloadable Conditional Access System (DCAS) in which a mutual authentication protocol between an authentication server of a headend and a secure micro (SM) of a DCAS host is provided in a cable network, so that a hardware-based authentication is not required, such as by a smart card or a cable card.

Another aspect of the present invention also provides an effective mutual authentication protocol which is able to process a variety of security processes, such as encoding/decoding of traffic data generated during a transmission of Conditional Access System (CAS) software in the DCAS, message authentication, or apparatus authentication.

Another aspect of the present invention also provides mutual authentication in a DCAS in which the mutual authentication is provided in the DCAS where a authentication is not required, so that operational costs of an authentication process is reduced and a fast system renewal is possible when a CAS defect occurs.

According to an aspect of the present invention, there is provided a method for mutual authentication of an SM in a DCAS including: receiving a session key generation information from an authentication server to derive a shared-session key; deriving a first shared-session key from the session key generation information and transmitting a ClientSignOn message for the derived first shared-session key to the authentication server; receiving a ClientSignOnConfirm message for a second shared-session key derived from the ClientSignOn message of the authentication server; and verifying whether the first shared-session message and the second shared-session message are identical with each other based on the ClientSignOnConfirm message so as to generate a mutual authentication result, and receiving CAS software from a headend system based on the mutual authentication result.

According to another aspect of the present invention, there is provided a method of mutual authentication of an authentication server in a DCAS including: receiving a session key generation information from an authentication authority to derive a shared-session key, and transmitting the session key generation information to an SM; receiving, from the SM, a ClientSignOn message for a first shared-session key derived from the session key generation information; and deriving a second shared-session key from the ClientSignOn message, and transmitting a ClientSignOnConfirm message for the second shared-session key to the SM.

According to still another aspect of the present invention, there is provides an apparatus for mutual authentication in DCAS including: an SM to derive a first shared-session key from session key generation information received from an authentication authority for deriving a shared-session key, and generate a ClientSignOn message for the derived first shared-session key; and an authentication server to receive the ClientSignOn message, derive a second shared-session key from the ClientSignOn message, and transmit a ClientSignOnConfirm message for the second shared-session key to the SM, wherein the SM verifies whether the first shared-session key and the second shared-session key are identical with each other so as to generate mutual authentication result, and receives CAS software from a headend system based on the mutual authentication result.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which:

FIG. 5 is a flowchart illustrating a mutual authentication process between an SM and an authentication server in a DCAS according to an example embodiment of the present invention.

DETAILED DESCRIPTION OF EXEMPLARY EMBODIMENTS

Figure 1:
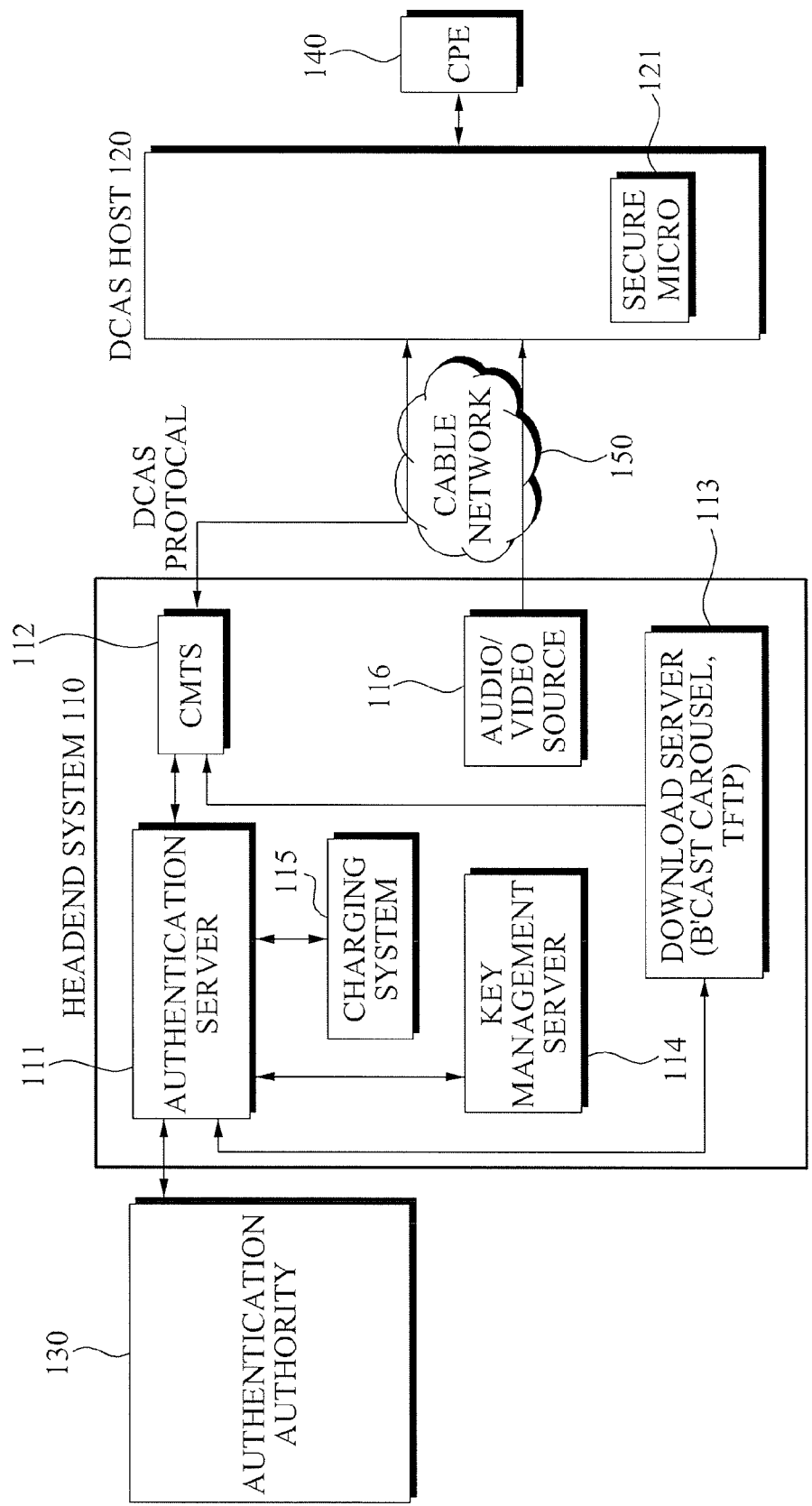
FIG. 1 illustrates a Downloadable Conditional Access System (DCAS) including a mutual authentication apparatus according to an example embodiment of the present invention.

Reference will now be made in detail to exemplary embodiments of the present invention, examples of which are illustrated in the accompanying drawings, wherein like reference numerals refer to the like elements throughout. The method and apparatus for mutual authentication in a Downloadable Conditional Access System (DCAS) according to example embodiments are described in detail below referring to the figures.

When detailed descriptions related to a well-known related function or configuration are determined to make the spirits of the present invention ambiguous, the detailed descriptions will be omitted herein. Also, terms used throughout the present specification are used to appropriately describe example embodiments of the present invention, and thus may be different depending upon a user and an operator's intention, or practices of application fields of the present invention. Therefore, the terms must be defined based on descriptions made through the present invention.

The terms 'Conditional Access System (CAS) host' and 'DCAS host' used in the present specification indicates a subscriber terminal.

Also, communication mechanism for a process and the protocol with respect to transmitted/received message among an authentication authority, an authentication server, and a secure micro (SM) is referred to as a DCAS protocol.

FIG. 1 illustrates a DCAS including a mutual authentication apparatus according to an example embodiment of the present invention.

Referring to FIG. 1, the DCAS of the present invention includes a headend system 110, a DCAS host 120, and an authentication authority 130. In order to manage information required for authentication and an authentication server 111 of the headend, an SM 121 of the DCAS host 120 does not use a cable provider, but uses a third-party, the authority 130, thereby providing the DCAS host 120 with CAS software technique for protecting improved video and media of Consumer Premise Equipment (CPE) 140 including a set-top box (STB), a set-top device (STD), or mobile or potable device.

The Authority authentication 120 performs secure communication with the authentication server 111 of the headend system 110 and provides information required for authentication. The authentication server 111 transmits session key information which is received from the authority authentication 130 and is required for authentication, to the SM 121 via a Cable modem Termination System (CMTS) 112. All the key information generated during the authentication is managed in a key management server 114. Upon completion of mutual authentication, CAS software is transmitted to the SM 121 via a download server 113.

Accordingly, the SM 121 that downloads (or updates) the CAS software obtains authority for viewing a transmitted scrambled broadcast signal so as to provide a subscriber with fee-based broadcasting service via the CPE 140.

A communication mechanism for a process and the protocol with respect to transmitted/received message among the above-described authentication authority 130, authentication sever 111, and SM 121 is referred to as a DCAS protocol. Based on the DCAS protocol, the transmitted/received message among the authentication authority 130, the authentication sever 111, and the SM 121 is secured and mutual authentication among the transmitted/received message among the authentication authority 130, the authentication sever 111, and the SM 121 is performed. The described DCAS protocol is described in detail referring to FIG. 3.

Figure 3:
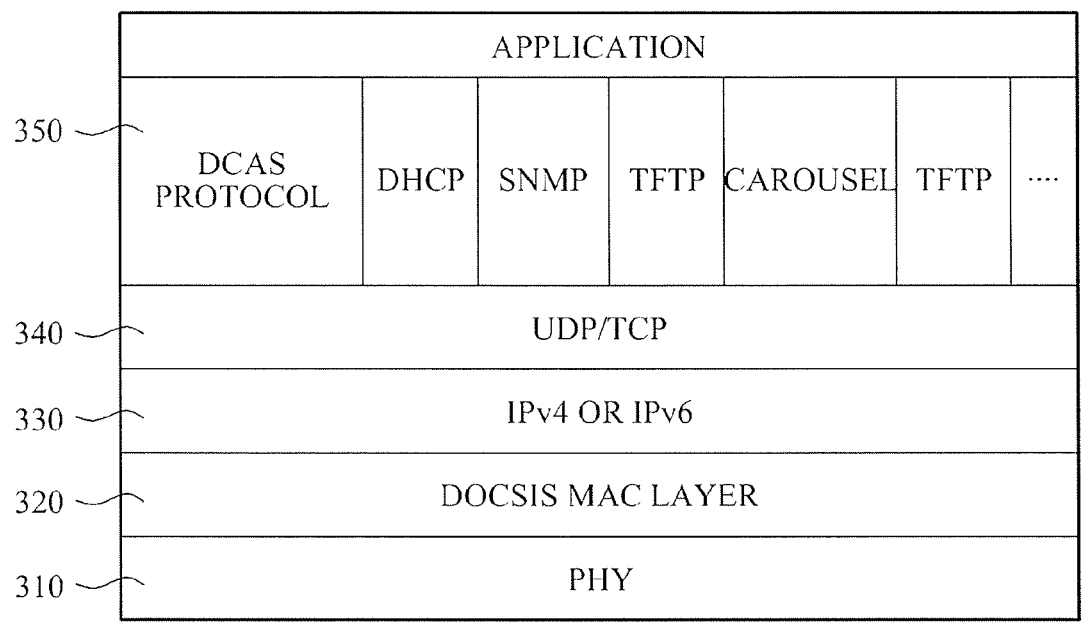
FIG. 3 illustrates a protocol stack in a DCAS including a DCAS protocol layer according to an example embodiment of the present invention.

FIG. 3 illustrates a protocol stack in a DCAS including a DCAS protocol layer according to an example embodiment of the present invention.

Referring to FIG. 3, the DCAS of the present invention includes a Physical (PHY) layer 310, a Data Over Cable Service Interface Specification Media Access Control (DOCSIS MAC) layer 320 through a cable network, an Internet Protocol (IP) layer 330, and DCAS protocol layer 350 separately operated from a User Datagram Protocol/Transmission Control Protocol (UDP/TCP) layer 340.

The mutual authentication apparatus of the present invention performs mutual authentication between the authentication server and the SM before performing transmission in order to reliably transmit CAS software to the SM of DCAS host based on the DCAS protocol. The mutual authentication apparatus for performing mutual authentication is described in detail referring to FIG. 2.

Figure 2:
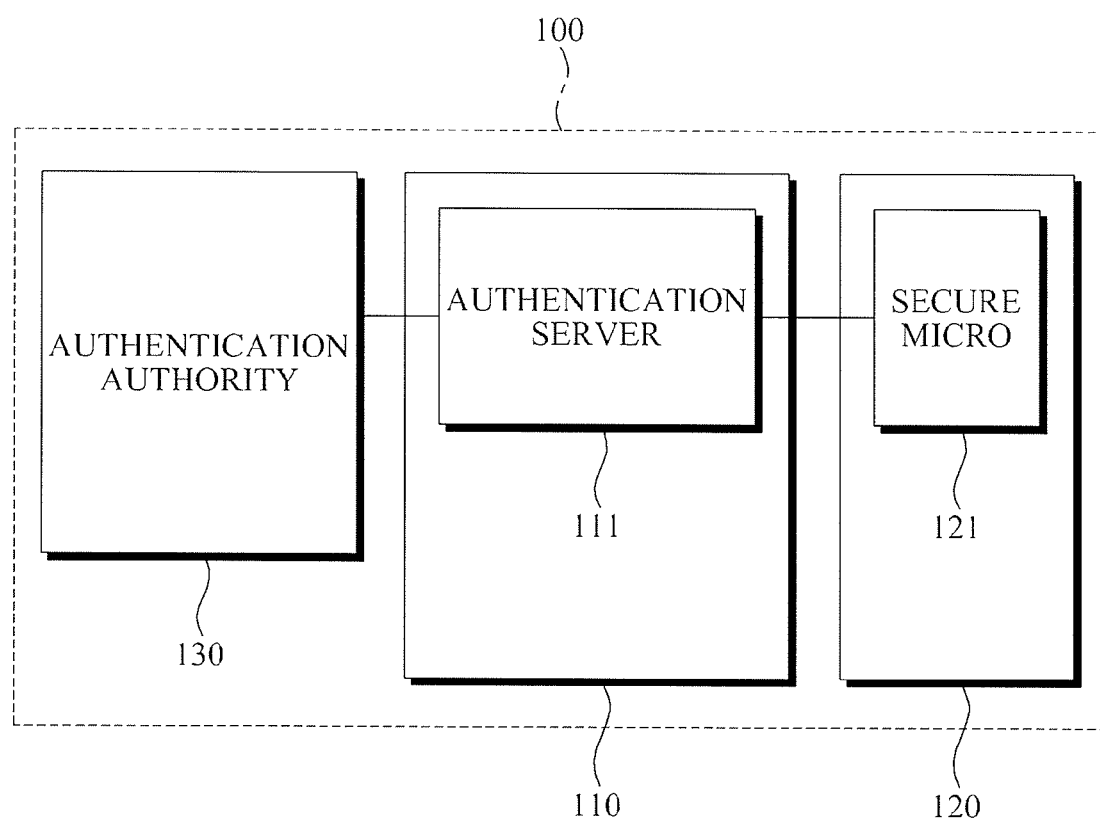
FIG. 2 illustrates configuration of a mutual authentication apparatus in a DCAS according to an example embodiment of the present invention.

FIG. 2 illustrates configuration of a mutual authentication apparatus 100 in a DCAS according to an example embodiment of the present invention.

Referring to FIG. 2, the mutual authentication apparatus 100 includes an SM 121 and an authentication server 111.

The SM 121 derives a first shared-session key from session key generation information which is received from an authenticated authority 130 for deriving a shared-session key, and generates a ClientSignOn message for the derived first shared-session key. The SM 121 may be located in a DCAS host 120. The authentication server 111 receives the ClientSignOn message from the SM 121, derives a second shared-session key from the ClientSignOn message, and transmits ClientSignOnConfirm message for the second shared-session key. Specifically, the SM 121 verifies whether the first shared-session key and the second shared-session key are identical with each other so as to generate a mutual authentication result, and receives CAS software from a headend system based on the generated mutual authentication result.

In particular, to derive a shared-session key between the SM 121 and the authentication server 111, the SM 121 receives AP_Certificate and/or a SecurityAnnounce message including the CAS software version (SM Client Version), and obtains a public key of the authentication server 111 from the SecurityAnnounce message so as to verify the SecurityAnnounce message. Therefore, the authentication server 111 transmits a DCASDownload message including Dowonload-Schedule for updating the CAS software, KeyRequest_REQ, or PurchaseReport_REQ to the SM 121.

After that, the SM 121 transmits a KeyRequest message including SM_Certificate and/or KeyPairingID. The Authentication server 111 transmits the KeyRequest message to the authentication authority 130 and receives a first random value (RAND_TA) generated from the authentication authority 130 and/or a KeyResponse message including a seed value (Kc) generated through a predetermined key generation algorithm in the authentication authority 130. The seed value (Kc) is generated through the key generation algorithm which takes a Pre-Shared Key (PSK) that is previously shared between the SM 121 and authentication authority 111 as an input.

Also, the SM 121 generates a shared-session key using a variety of information and values as described above. In particular, the authentication server 111 transmits the keyResponse message including the first random value (RAND_TA) to the SM 121, and the SM 121 derives the first shared-session key from unique information (SM_ID) of the DCAS host 120, the seed value (Kc), a second random value (NONCE_SM) generated from the SM 121, or a hardware/software version (HW_SW_Version). That is, the SM 121 performs a hash function which takes the unique information (SM_ID), the second random value (NONCE_SM), the hardware/software version (HW_SW_Version), or the seed value (Kc) as an input value, and then performs a random function which takes a master key value outputted from the hash function as an input value. Also, the SM 121 selects a certain bit of a key value outputted from the random value as the first shared-session key.

To share a shared-session key with the SM 121, the authentication server 111 also receives the ClientSignOn message from the SM 121, derives the second shared-session key from the ClientSignOn message including the unique information (SM_ID), the second random value (NONCE_SM), or hardware/software version (HW_SW_Version), and transmits a ClientSiongOnConfirm message for the second shared-session key to the SM, wherein the second shared-session key is generated from the ClientSignOn message, the seed value (Kc), and the first random value (RAND_TA).

That is, the authentication server 111 performs a hash function which takes the unique information (SM_ID), the second random value (NONCE_SM), and the hardware/software version (HW_SW_Version), or the seed value (Kc) as an input value, and then performs a random function which takes master key value outputted from the hash function. Also, the authentication server 111 selects a certain bit of a key value outputted from the random function as the second shared-session key.

The SM 121 verifies whether the first shared-session key and the second shared-session key are identical with each other from the ClientSignOn message so as to receive the CAS software from the headend system 110. That is, success of the mutual authentication depends on whether the first shared-session key and the second shared-session key are identical with each other. When the mutual authentication is successful, the SM 121 downloads the CAS software.

In particular, the authentication server 111 encodes client information (SM_Client_Info_Set) through a predetermined symmetric key encryption algorithm which takes the second shared-session key and an Initial Vector (IV) as an input value, generates the ClientSignOnConfirm message including the unique value (SM_ID), the client information (SM_Client_Info_Set), or the IV, and transmits the ClientSignOnConfirm message to the SM 121. The SM 121 decodes the ClientSignOnConfirm message encoded by the IV and the first shared-session key, through the symmetric key encryption algorithm so as to generate a mutual authentication result (Success/Failure), and transmits the mutual authentication result to the authentication server 111. The authentication server 111 analyzes the mutual authentication result. When the mutual authentication result is success, the authentication server 111 transmits a DownloadInfo message including IP address (DS_IP) of the download server where the CAS software is stored, software identification information (FN), protocol information (TM), or PurchaseReport_REQ to the SM 121 After that, the SM 121 downloads the CAS software from the DownloadInfo message.

Figure 4A:
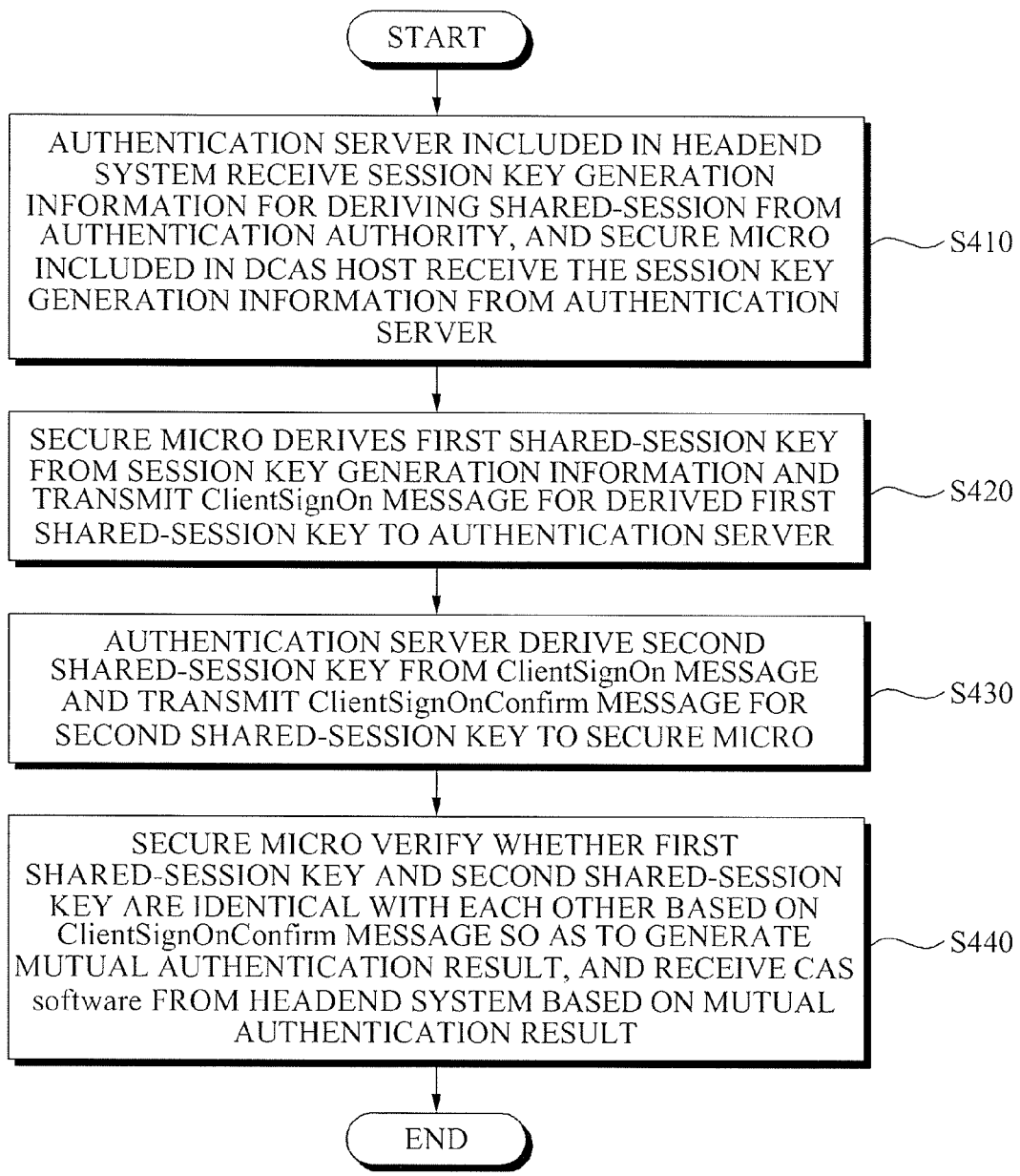
FIG. 4A is a flowchart illustrating a mutual authentication method in a DCAS according to an example embodiment of the present invention.

FIG. 4A is a flowchart illustrating a mutual authentication method in a DCAS according to an example embodiment of the present invention.

Referring to 4A, an authentication server included in a headend system receives session key generation information for deriving a shared-session from an authentication authority, and an SM included in a DCAS host receives the session key generation information from the authentication server in operation S410. After that, the SM derives a first shared-session key from the session key generation information, and transmits a ClientSignOn message for the derived first shared-session key to the authentication server in operation S420. In operation S430, the authentication server derives the second shared-session key from the ClientSignOn message and transmits a ClientSignOnConfirm message for the second shared-session key to the SM. In operation S440, the SM verifies whether the first shared-session key and the second shared-session key are identical with each other based on the ClientSignOnConfirm message so as to generate mutual authentication result, and receives CAS software from the headend system based on the mutual authentication result. The mutual authentication method is described in detail in the description of FIG. 5.

Figure 4B:
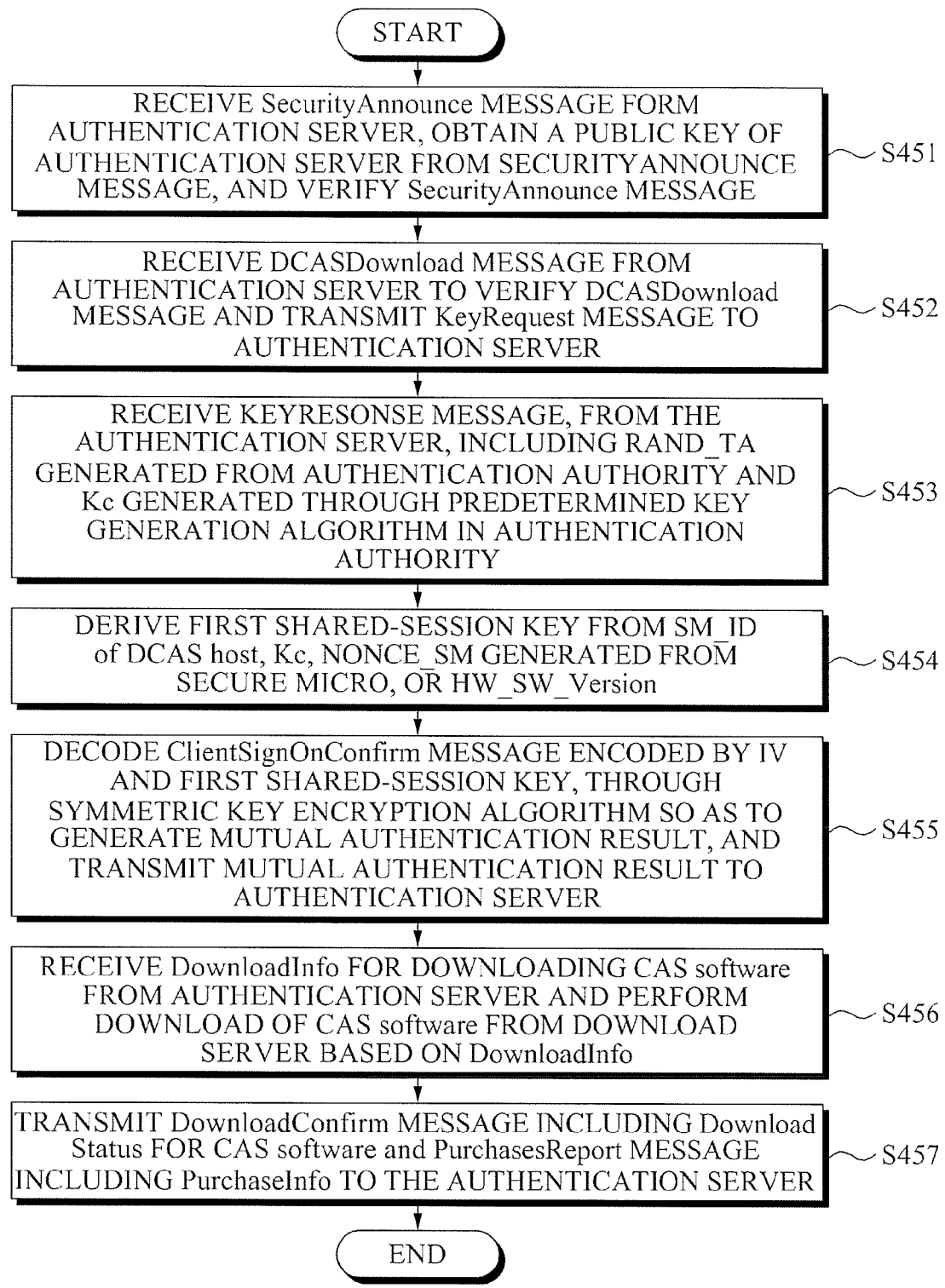
FIG. 4B is a flowchart illustrating a mutual authentication method of a secure micro (SM) in a DCAS according to an example embodiment of the present invention.

FIG. 4B is a flowchart illustrating a mutual authentication method of an SM in a DCAS according to an example embodiment of the present invention.

Referring to FIG. 4B, the SM receives a SecurityAnnounce message from an authentication server, obtains a public key of the authentication server from the SecurityAnnounce message, and verifies the SecurityAnnounce message in operation S451. In operation S452, the SM receives a DCASDownload message to verify the same and transmit a KeyRequest message to the authentication server. As described above, the SecurityAnnounce message includes AP_Certificate information or the CAS software version (SM Client Version) and the DCASDownload message includes DownloadSchedule, KeyRequest_REQ, or PurchaseReport_REQ. Also, the KeyRequest message includes SM_Certificate and/or KeyPairingID.

In operation S453, the SM receives a KeyResponse message, from the authentication server, including the first random value generated from the authentication authority and seed value generated through a predetermined key generation algorithm in the authentication authority.

In operation S454, the SM derives the first shared-session key from unique information of a DCAS host, the seed value, a second random value generated from the SM, or hardware/software version. In detail, the first shared-session key is generated by performing of a hash function which takes the unique information, the second random value, the hardware/software version, or the seed value as an input value, performing of a random function which takes a master key value outputted from the hash function as an input value; and selecting of a certain bit of a key value outputted from the random function as the first shared-session key.

In operation S455, the SM decodes a ClientSignOnConfirm message encoded by an IV and the first shared-session key, through a symmetric key encryption algorithm so as to generate a mutual authentication result, and transmit the mutual authentication result to the authentication server.

In operation S456, the SM receives DownloadInfo message for downloading the CAS software from the authentication server and performs a download of the CAS software from a download server based on the DownloadInfo message.

The DownloadInfo message includes an IP address of a the download server where the CAS software is stored, software identification information, protocol information, or PurchaseReport_REQ as described in the foregoing description.

In operation S457, the SM transmits a DownloadConfirm message including a Download status for the CAS software and a PurchasesReport message including PurchaseInfo to the authentication server.

Figure 4C:
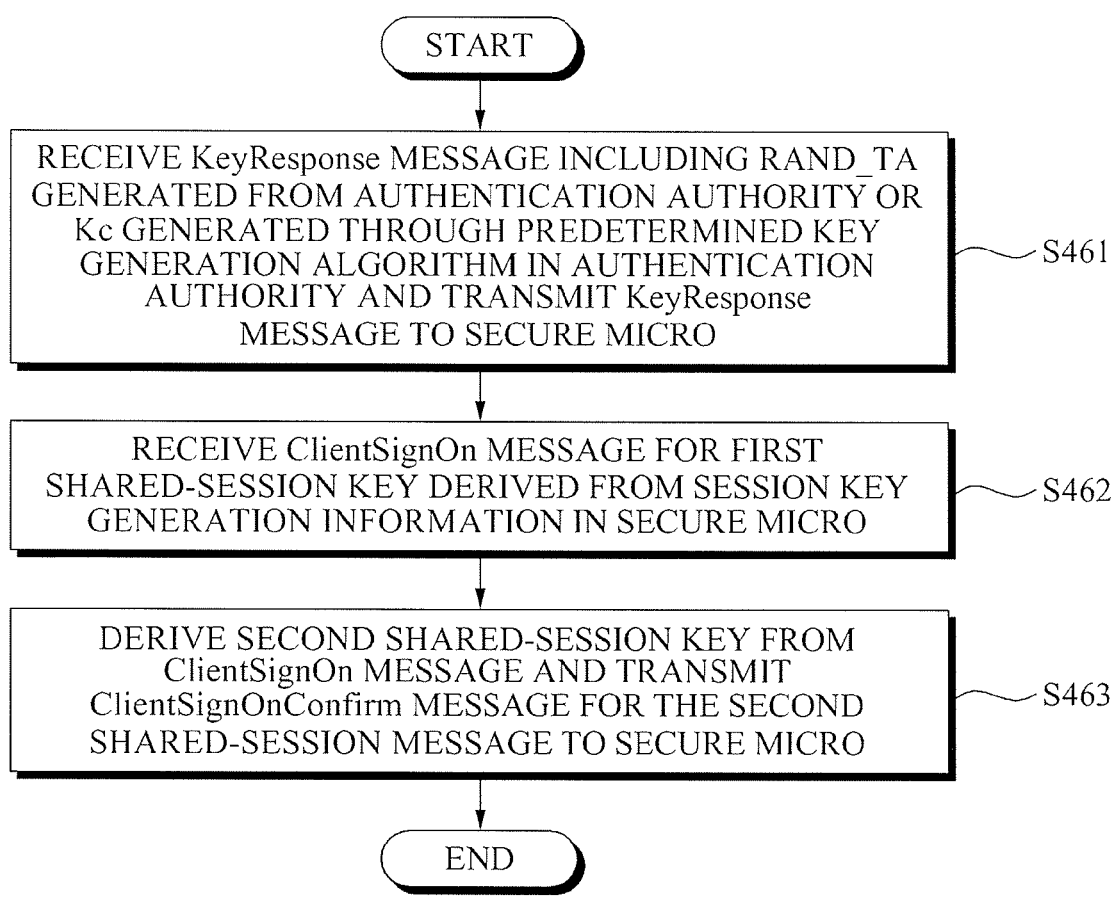
FIG. 4C is a flowchart illustrating a mutual authentication method of an authentication server in a DCAS according to an example embodiment of the present invention.

FIG. 4C is a flowchart illustrating a mutual authentication method of an authentication server in a DCAS according to an example embodiment of the present invention.

Referring to the FIG. 4C, the authentication server receives a session key generation information from an authentication authority to derive a shared-session key and transmit the session key generation information to an SM. In detail, the authentication receives KeyResponse message including a first random value generated from the authentication authority and/or seed value generated through a predetermined key generation algorithm in the authentication authority and transmit the KeyResponse message to the SM 121 in operation S461. The seed value is generated through the key generation algorithm which takes a PSK that is previously shared between the SM 121 and the authentication authority 111 as an input, as described in the foregoing description.

In operation S462, the authentication server receives the session key generation information for deriving a shared-session key, and also receives a ClientSignOn message for the first shared-session key derived from the session key generation information in operation S462. The ClientSignOn message includes unique information, a second random value generated from the SM 121, or hardware/software version.

In operation S463, the authentication server derives a second shared-session key from the ClientSignOn message and transmits a ClientSignOnConfirm message for the second shared-session message to the SM. The second shared-session key is generated from the ClientSignOn message, the seed value, and the first random value. In detail, the second shared-session key is generated by performing of a hash function which takes the unique information, the second random value, the hardware/software version, or the seed value as an input value, performing of a random function which takes a master key value outputted from the hash function as an input value; and selecting of a certain bit of a key value outputted from the random function as the second shared-session key.

FIG. 5 is a flowchart illustrating a mutual authentication process between an SM and an authentication server in a DCAS.

Referring to FIG. 5, the authentication server 111 signs a SecurityAnnounce message including AP_Certificate information and/or CAS software version with a private key of the authentication server 111 and transmit the SecurityAnnounce message to the SM 121.

In operation S502, when the CAS software is already installed in the SM 121, the authentication server 111 signs a DCASDownload message including DownloadSchedule for updating the CAS software, KeyRequest_REQ, or PurchaseReport_REQ with the private key of the authentication server 111 and transmits the same to the SM 121. The KeyRequest_REQ includes information about whether the SM 121 requests a key for re-performing derivation of session key. The PurchaseReport_REQ includes request information for collecting a purchasing record of Impulse Pay Per View (IPPV) stored in the SM 121.

In operation S504, the SM 121 transmits a KeyRequest message including SM_Certificate information and/or KeyPairingID of the SM 121 to the authentication server 111, the KeyPairingID including information for performing derivation of a session key. In operation S504, the authentication server 111 obtains SM_Certificate information first and then obtains a public key of the SM 121, so that the authentication server 111 verifies the KeyRequest message and signs the KeyRequest message which includes only the KeyRairingID with a private key of the authentication server 111.

In operation S505, the authentication server 111 receives a KeyResponse message including a first random value (RAND_TA) and/or seed value (Kc) generated through a predetermined key generation algorithm in the authentication authority 130. In operation S506, the authentication server 111 signs the KeyResponse message including the first random value (RAND_TA) with the private key of the authentication server 111 and transmits the KeyRespone message to the SM 121. The first random value (RAND_TA) is a predetermined number which is required for deriving a session key to be shared between the authentication server 111 and the SM 121. The seed value (Kc) is generated through a predetermined algorithm which takes a PSK as an input value, the PSK being previously shared between the SM 121 and the authentication authority 130. Also, the KeyResponse message received from the authentication authority 130 is signed with the private key of the authentication authority 130.

In operation S507, the SM 121 derives the first shared-session key from unique information (SM_ID) of a DCAS host, the seed value (Kc), and a second random value (NONCE_SM) generated from the SM 121, or hardware/software version (HW_SW_Version) of the SM 121.

In operation S508, the SM 121 signs ClientSignOn message including the unique information (SM_ID), the second random value (NONCE_SM), or the hardware/software version (HW_SW_Version) with a private key of the SM 121 and transmits the ClientSignOn message to the authentication server 111.

In operation S509, the authentication server 111 derives a second shared-session key from the ClientSignOn message, the seed value (Kc), and the first random value (RAND_TA).

In operation S510, the unique information (SM_ID) and Client information (SM Client Info_Set) are encoded in the authentication server 111 through a predetermined symmetric key encryption algorithm which takes the second shared-session key and an TV as an input value. ClientSignOnConfirm message including the unique information (SM_ID), the client information (SM_Client_Info_Set), or the IV is generated, signed with a private key of the authentication server 111 and transmitted to the SM 121. The client information (SM_Client_Info_Set) includes information which may be downloaded as a SM of a DCAS host, such as DRM software or ASD software, in addition to CAS software.

Figure 6:
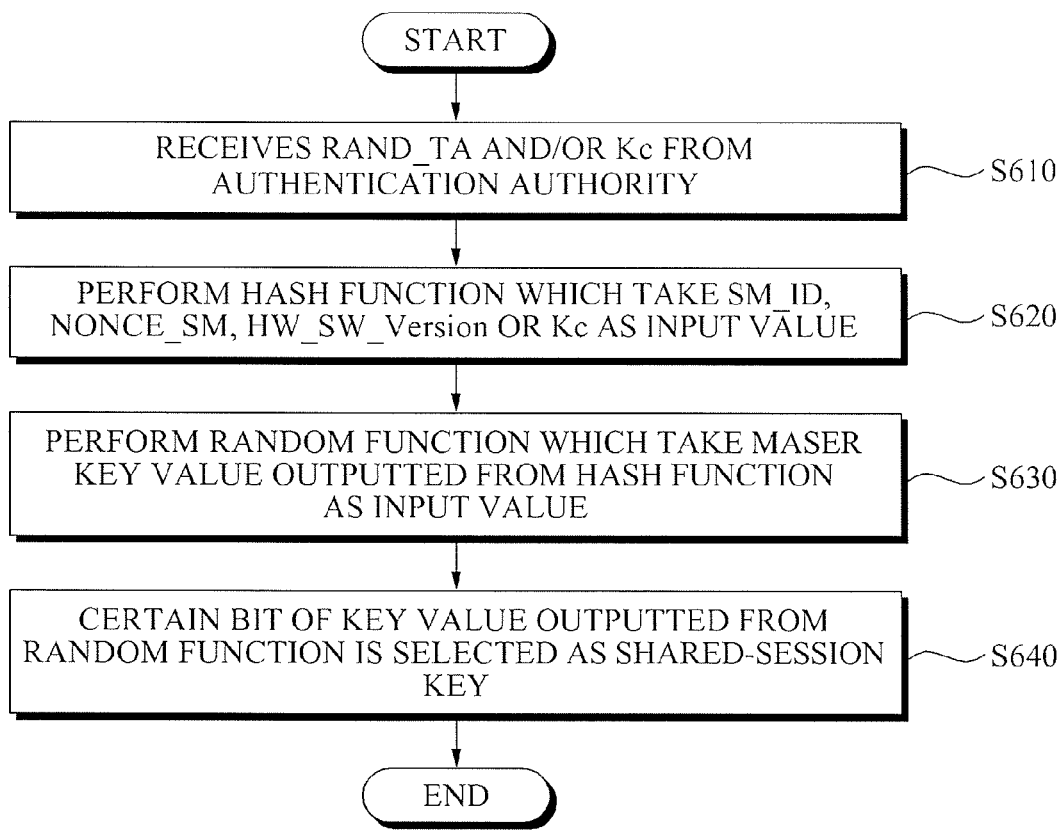
FIG. 6 is a flowchart illustrating a deriving process of a shared-session key for mutual authentication according to an example embodiment of the present invention.

A deriving process of the first shared-session key or the second shared-session key is described in detail referring to FIG. 6.

FIG. 6 is a flowchart illustrating a deriving process of a shared-session key for mutual authentication, and the deriving process of the shared-session key may be performed in either an SM of a DCAS host or an authentication server of a headend system.

Referring to FIG. 6, the SM or the authentication server receives, through an authentication authority, a first random value (RAND_TA) required for deriving the shared-session key and/or seed value (Kc) generated through a predetermined key generation algorithm in the authentication authority in operation S610.

In operation S620, a hash function is performed, which takes unique information (SM_ID), a second random value (NONCE_SM), hardware/software version (HW_SW_Version), or the seed value (Kc) as an input value. In this case, it is determined whether at least one value is inputted as the seed value (Kc) according to Security Policy between the authentication authority 130 and authentication server 111.

In operation S630, a random function is performed, which takes a master key value outputted from the hash function as an input value. In operation S640, a certain bit of the key value outputted from the random function is selected as the shared-session key.

According to the above description, the share-session key derived from the SM corresponds to a first shared-session key and the shared-session key derived from the authentication corresponds to a second shared-session key.

Referring to FIG. 5 again, the SM 121 decodes a ClientSignOnConfirm message encoded by an IV, the first shared-session key, through a symmetric key encryption algorithm so as to generate a mutual authentication result (Success/Failure), sign the mutual authentication result with a private key of the SM 121, and transmit the same to the authentication server in operation S511. In operation S512, the authentication server 111 analyzes the mutual authentication result and when the mutual authentication result is success, the authentication server transmits a DownloadInfo message for downloading CAS software. The DownloadInfo messageincludes an IP address (DS_IP) of a download server where the CAS software is stored, software identification information (FN) which is the same as a file name of the software, protocol information (TM), and PurchaseReport_REQ.

The SM 121 receives the CAS software from the download server based on the DownloadInfo message. Also, when the CAS software is already installed in the CAS software, the CAS software is updated. The SM 121 performs a download of the CAS software from the DownloadInfo message, and then transmits a DownloadConfirm message including a CAS software download result, namely, Download Status to the authentication server 111 in operation S513.

Also, when the PurchaseReport_REQ is transmitted in operation S512, the SM 121 transmits PurchasesReport message including IPPV PurchaseInfo to the authentication server 111, so as to end the mutual authentication process in operation S514.

The mutual authentication method in the DCAS according to example embodiments may be recorded in computer-readable media including program instructions to implement various operations embodied by a computer. The media may also include, alone or in combination with the program instructions, data files, data structures, and the like. The media and program instructions may be those specially designed and constructed for the purposes of example embodiments, or they may be of the kind well-known and available to those having skill in the computer software arts. Examples of computer-readable media include magnetic media such as hard disks, floppy disks, and magnetic tape; optical media such as CD ROM disks and DVD: magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of example embodiments.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method for mutual authentication of a secure microprocessor (SM) in a Downloadable Conditional Access System (DCAS) comprising:

receiving at a SM session key generation information from an authentication server;

receiving at the SM a SecurityAnnounce message from the authentication server, obtaining a public key of the authentication server from the SecurityAnnounce message, and verifying the SecurityAnnounce message;

receiving at the SM a DCASDownload message from the authentication server;

deriving at the SM a first shared-session key from the session key generation information, and transmitting a ClientSignOn message for the derived first shared-session key to the authentication server;

receiving at the SM a ClientSignOnConfirm message for a second shared-session key derived from the ClientSignOn message of the authentication server; and verifying at the SM whether the first shared-session message and the second shared-session message are identical with each other based on the ClientSignOnConfirm message so as to generate a mutual authentication result, and receiving at the SM Conditional Access System (CAS) software from a headend system based on the mutual authentication result.

2. The method of claim 1, wherein the receiving of the DCASDownload message from the authentication server comprises:

performing ClientSignOn for the DCASDownload message; and tranmitting a KeyRequest message to the authentication server.

3. The method of claim 2, wherein the KeyRequest message comprises SM_Certificate or Key PairingID.

4. The method of claim 1, wherein the SecurityAnnounce message comprises access point certificate (AP_Certificate) information or CAS software version (SM Client version).

5. The method of claim 1, wherein the DCASDownload message comprises DownloadSchedule, KeyRequest_REQ, or PurchaseReport_REQ.

6. The method of claim 1, wherein the deriving of the first shared-session key from the session key generation information, and the transmitting of the ClientSignOn message for the derived first shared-session key to the authentication server comprises:
   receiving a KeyResponse message from the authentication server, the KeyResponse message including a first random value generated from an authentication authority and a seed value generated through a predetermined key generation algorithm in the authentication authority; and
   deriving the first shared-session key from unique information of a DCAS host, the seed value, a second random value generated from the SM, or hardware/software version.

7. The method claim 6, wherein the deriving of the first shared-session key from the unique information of the DCAS host, the seed value, the second random value generated from the SM, or the hardware/software version comprises:
   performing a hash function which takes the unique information, the second random value, the hardware/software version, or the seed value as an input value;
   performing a random function which takes a master key value outputted from the hash function as an input value; and
   selecting a certain bit of a key value outputted from the random function as the first shared-session key.

8. The method of claim 7, wherein the ClientSignOn message comprises the unique information, the second random value, or the hardware/software version.

9. The method of claim 1, wherein the verifying of whether the first shared-session message and the second shared-session message are identical with each other based on the ClientSignOnConfirm message so as to generate the mutual authentication result, and receiving of the CAS software from the headend system based on the mutual authentication result comprises:
   decoding the ClientSignOnConfirm message encoded by an Initial Vector (IV) and the first shared-session key through a symmetric key encryption algorithm so as to generate a mutual authentication result, and transmitting the mutual authentication result to authentication server; and
   receiving a DownloadInfo message for downloading the CAS software from the authentication server.

10. The method claim 9, wherein the DownloadInfo message comprises an IP address (DS_IP), software identification information (FN), protocol information (TM), or PurchaseReport_REQ.

11. The method claim 9, wherein the verifying of whether the first shared-session message and the second shared-session message are identical with each other based on the ClientSignOnConfirm message so as to generate the mutual authentication result, and receiving of the CAS software from the head end system based on the mutual authentication result comprises:
   performing a download of the CAS software from a download server based on the DownloadInfo message, and transmitting a DownloadConfirm message including Download Status (DS) for the CAS software to the authentication server.

12. The method claim 11, wherein the performing of the download the CAS software from the download server based on the DownloadInfo message and the transmitting of the DownloadConfirm message including the DS message to the authentication server comprises:
   transmitting a PurchasesReport message including PurchaseInfo to the authentication server.

13. The method of claim 1, wherein the headend system transmits a DownloadInfo message that includes an internet protocol (IP) address of a download server where the SM CAS software is stored only if the SM determines that the first shared-session key and the second shared-session key are identical.

14. A method of mutual authentication of an authentication server in a Downloadable Conditional Access System (DCAS) comprising:
   receiving session key generation information from an authentication authority to derive a first shared-session key, and transmitting the session key generation information to a secure micro-processor (SM);
   receiving at the SM a SecurityAnnounce message from the authentication server, obtaining a public key of the authentication server from the SecurityAnnounce messge, and verifying the SecurityAnnounce message;
   receiving at the SM a DCASDownload message from the authentication server;
   deriving the first shared-session key at the SM;
   receiving a ClientSignOn message for the first shared-session key derived by the SM;
   deriving a second shared-session key from the ClientSignOn message, and transmitting a ClientSignOnConfim message for the second shared-session key to the SM; and
   receiving a verification message from the SM, wherein the verification message indicates whether the first shared-session key and the second shared-session key are identical to each other.

15. The method of claim 14, wherein the receiving of the session key generation information from the authentication authority to derive the shared-session key, and the transmitting of the session key generation information to the SM comprises:
   receiving a KeyResponse message including a first random value generated from the authentication authority and a seed value generated through a predetermined key generation algorithm in the authentication authority; and
   transmitting the KeyResponse message to the SM.

16. The method of claim 15, wherein the seed value is generated through the key generation algorithm which takes a Pre-shared Key (PSK) as an input value, the PSK being previously shared between the SM and the authentication authority.

17. The method of claim 15, wherein the ClientSignOn message comprises unique information, a second random value generated from the SM, or version of hardware/software, and the deriving of the second shared-session key from the ClientSignOn message, and transmitting of the ClientSignOnConfirm message for the second shared-session key to the SM comprises:
   deriving the second shared-session key from the ClientSignOn message, the seed value, and the first random value; and
   encoding the unique information and client information through a predetermined symmetric key encryption algorithm which takes the second shared-session key and an initial vector (IV) as an input value.

18. The method of claim 17, wherein the deriving of the second shared-session key from the ClientSignOn message, the seed value, and the first random value comprises:
- performing a hash function which takes the unique information, the second random value, the hardware/software version, or the seed value as an input value;
- performing a random function which takes a master key value outputted from the hash function as an input value; and
- selecting a certain bit of a key value outputted from the random function as the second shared-session key.

19. The method of claim 17, wherein the ClientSignOnConfirm message comprises the unique information, the client information, or the (initial vector) IV.

20. An apparatus for mutual authentication in a Downloadable Conditional Access System (DCAS) comprising:
- a secure micro-processor (SM) that derives a first shared-session key from session key generation information received from an authentication authority for deriving a shared-session key, and generate a ClientSignOn message for the derived first shared-session key, receives a SecurityAnnounce message from the authentication server, obtains a public key of the authentication server from the SecurityAnnounce messge, verifies the SecurityAnnounce message, and receives a DCASDownload message from the authentication authority; and
- a hardware server that receives the ClientSignOn message, derives a second shared-session key from the ClientSignOn message, and transmits a ClientSignOnConfirm message for the second shared-session key to the SM,
- wherein the SM verifies whether the first shared-session key and the second shared-session key are identical with each other so as to generate mutual authentication result, and receives conditional access system software from a headend system based on the mutual authentication result.

21. The apparatus of claim 20 wherein the SM selects a bit of a generated key value as the first shared-session key.

* * * * *